United States Patent Office 3,251,892
Patented May 17, 1966

3,251,892
PARTIAL HYDROGENATION OF CYCLOALIPHATIC COMPOUNDS CONTAINING AT LEAST TWO OLEFINIC DOUBLE BONDS
Matthias Seefelder and Wolfgang Raskob, Ludwigshafen am Rhine, Germany, assignors to Badische Anilin- & Soda-Fabrik Aktiengesellschaft, Ludwigshafen am Rhine, Germany
No Drawing. Filed May 18, 1962, Ser. No. 195,969
Claims priority, application Germany, May 20, 1961, B 62,573
5 Claims. (Cl. 260—666)

This invention relates to a process for the production of cycloaliphatic and alicyclic compounds containing one olefinic unsaturation by catalytic hydrogenation of cycloaliphatic compounds containing at least two olefinic double bonds. More specifically, the invention relates to the applictaion of a catalyst which has hitherto not been used for this purpose.

Attempts have been made to hydrogenate cyclopentadiene selectively to cyclopentene with hydrogen in the presence of Raney nickel or metallic palladium. Processes have also been described for the hydrogenation of cyclooctatetraene to cyclooctene in the presence of base metals or palladium. These processes suffer from the disadvantage that the hydrogenation is not sufficiently selective. A reduction in the hydrogen consumption is observed when the monolefine stage has been reached. The reaction does not, however, come to a point even near a standstill so that it is impossible to obtain a completely pure monolefine. If the hydrogenation is carried on until the theoretical quantity of hydrogen has been consumed, then a reaction mixture is obtained which contains varying quantities of completely hydrogenated starting material, unreacted starting material and compounds containing more than one double bond. The composition of the reaction mixture varies with the selectivity of the catalyst. It is obvious that a high selectivity is desirable as catalysts which are unsatisfactory in this respect are susceptible to irregularities in the hydrogen supply. Thus, they produce considerable quantities of saturated compounds, if the quantity of hydrogen is increased suddenly.

It is an object of the invention to provide a process for the production of cycloaliphatic compounds containing one olefinic unsaturation with a high degree of selectivity. Another object of the invention is to provide a process for the production of cycloaliphatic compounds containing one olefinic unsaturation with a high degree of purity. A further object of the invention is to provide a process for the production of compounds containing one olefinic unsaturation, which is substantially unaffected by sudden increases in the supply of hydrogen. Other objects of the invention will become apparent from the following description.

In accordance with this invention, these objects and advantages are achieved by catalytic, partial hydrogenation of cycloaliphatic compounds, containing at least two olefinic double bonds, with molecular hydrogen in the presence of palladium metal and the ions of a second heavy metal.

As a result of the high selectivity of the catalysts the cyclic monoolefines are obtained by the new process with a degree of purity which has hitherto been unattainable using catalytic hydrogenation. The rate of the hydrogenation falls when the monolefine stage has been reached to a fraction of its original value.

It is well known that palladium metal, which has been "poisoned" by heavy metal ions, is a suitable catalyst for the partial hydrogenation of carbon-carbon triple bonds to olefinic linkages. It has now been found that, contrary to expectation, olefinic double bonds in cycloaliphatic compounds containing at least two olefinic double bonds are also hydrogenated to the monoolefine stage.

The new process can be applied in particular to cycloaliphatic hydrocarbons which contain 2 to 4 conjugated or non-conjugated double bonds in an alicyclic ring with 5 to 12, preferably with 5 to 10, carbon atoms. The alicyclic ring can bear either hydrogen atoms alone or may be substituted by 1 to 3 alkyl groups with 1 to 4 carbon atoms. Other suitable starting materials are cycloaliphatic hydrocarbons which contain 1 or 2 double bonds in a ring containing 5 to 12, preferably 5 to 8 carbon atoms, and additionally 1 or 2 conjugated or non-conjugated double bonds in a side chain containing 2 to 6 carbon atoms, or in a second, if desired condensed, alicyclic ring containing 5 to 8 carbon atoms. Examples of the first group of starting materials are cyclopentadiene, 1,3-cyclohexadiene, 1,3,5-cycloheptatriene, 1,3-cyclooctadiene, 1,5-cyclooctadiene, cyclooctatetraene, cyclododecadiene, methylcyclopentadiene, and dimethylcyclooctadiene. Examples of the second group are 1-vinyl-1-cyclohexene, 1-vinyl-4-cyclohexene, limonene, 1,1'-dicyclohexenyl, dicyclopentadiene and bicyclo-(4,2,0)-octatriene-(2,4,7).

The palladium is conveniently obtained by reduction in the usual way from a palladium compound such as palladium (II) chloride, palladium (II) nitrate, palladium oxide or complex compounds of palladium such as dipotassium tetrachloropalladate (II), dipotassium hexachloropalladate (II) and diamminopalladium (II) chloride. The reduction can be carried out, for example, with hydrogen, formaldehyde, hydrazine or formic acid. The palladium metal can be precipitated on an inert carrier. Suitable carriers include active charcoal, aluminum oxide, barium sulfate, calcium carbonate, pumice, silicates and silica gel. The proportion of palladium in supported catalysts normally varies between 0.002 and 5% by weight, calculated on the total catalyst.

The hydrogenation according to the new process takes place in the presence of heavy metal ions. Heavy metal ions are considered to be those derived from metals with a specific gravity above 5. Suitable heavy metal ions are thus, for example, those of copper, silver, zinc, cadmium, mercury, thallium, lead, tin, antimony, bismuth, vanadium, zirconium and iron. Obviously, the process can also be carried out in the presence of ions derived from several, for example, 2 to 4 of the metals quoted. Salts of the heavy metals or other compounds in which the heavy metal is positively charged, i.e., is present as cation, are used as compounds yielding heavy metal ions. The nature of the anion is not critical provided that it is not a definite catalyst poison. Cyanides, thiocyanates, sulfides and arsenites are catalyst poisons and inhibit completely the catalytic effect of palladium on the transfer of hydrogen. Other anions, on the other hand, sometimes exert a certain effect on the selectivity and rate of hydrogenation, but do not impair the suitability of the catalyst for the selective hydrogenation according to the invention. Suitable heavy metal compounds are, for example, carbonates, hydrogen carbonates, oxides, hydroxides, chlorides, bromides, sulfates, nitrates, silicates, borates, acetates, oxalates, benzoates, α-chloropropionates, citrates, phenolates, 8-hydroxyquinolates, naphthenates and palmitates of the metals referred to.

The optimum proportions of heavy metal ions vary according to the metal and can be readily determined by preliminary experiment. Thus, in the case of antimony, quantities of 0.2% by weight, preferably 0.5 to 1%, are sufficient to obtain adequate selectivity. On the other hand, catalysts containing 1000 times more zinc than palladium show an adequate rate of hydrogenation with excellent selectivity.

In the preparation of the catalyst the palladium metal can be treated during or preferably after reduction of the palladium salt with a heavy metal compound. It is expedient to use a heavy metal salt which is dissolved in an inert solvent such as water or alcohol. The concentration advantageously lies between 0.1 and 40% by weight. The treatment is usually carried out at a temperature between about 0 and 100° C. It is very advantageous to start at room temperature and then heat the mixture to boiling for some time, for example, 5 to 120 minutes. After cooling, the solution is separated from the palladium metal which can then be used as catalyst.

Another method is to precipitate the palladium and the substance yielding heavy metal ions together, for example, in the form of oxide, hydroxide, carbonate or silicate, if desired in the presence of an inert carrier. The mixture is then reduced, for example, by heating in a stream of hydrogen. If the heavy metal compound is present during the precipitation in excess over the palladium compound, then the heavy metal oxide, hydroxide, carbonate or silicate acts simultaneously as carrier. In catalysts of this type the proportion of metallic palladium should be between 0.001 and 5% by weight calculated on the total catalyst.

The treatment of the palladium with the compounds providing heavy metal ions can also be combined with the actual hydrogenation by adding a suitable heavy metal compound which should be dissolved in a solvent to the starting material which contains the suspended palladium. In this case the use of heavy metal compounds which are soluble in hydrocarbons is recommended.

Suitable compounds providing heavy metal ions include the following: copper (I) chloride, copper (I) nitrate, copper (II)-chloride, copper (II) acetate, copper (II) nitrate, silver nitrate, zinc sulfate, zinc acetate, zinc butyrate, zinc hydroxide, tetrammine zinc sulfate, cadmium formate, cadmium sulfate, mercury (II) chloride, thallium (I) sulfate, thallium (III) chloride, lead (II) acetate, lead (II) nitrate, lead (IV) chloride, lead (IV)-acetate, antimony (III) chloride, iron (II) chloride, iron (III)-chloride and ferric-ammonium alum.

The addition of basic substances such as ammonia or amines as additional deactivators is often advantageous, but is not absolutely essential. The rate of hydrogenation is reduced by this means while the selectivity is increased. Organic sulfur compounds also favorably affect the selectivity. Suitable compounds of this type are, for example, thiophene, thiophenol and diphenyl sulfide. Ethers which can be employed as solvents also have a favorable effect on the selectivity.

The process can also be carried out in the presence of inert solvents or diluents. The suitability of a given solvent may readily be determined by preliminary experiment. As a rule, saturated hydrocarbons such as n-heptane and cyclohexane, and alcohols, esters or ketones are suitable.

The temperature of the hydrogenation can vary within wide limits. The selectivity falls with increasing temperature while the rate of the reaction falls as the temperature is reduced so that the hydrogenation is advantageously carried out between —20 and +150° C., preferably between 0 and 100° C. The hydrogenation according to the invention is preferably carried out at ordinary pressure, but increased pressure may also be used. The invention is illustrated by, but not limited to, the following examples.

The parts and percentages specified are by weight and are related to parts by volume in the proportion g. to l.

*Example 1*

The catalyst is prepared by adding a solution of 10 parts palladium (II) chloride in 300 parts water containing a few drops of hydrochloric acid to a suspension of 150 parts calcium carbonate in 700 parts water with stirring. The suspension is heated to 80° C. and shaken with hydrogen until no more hydrogen is absorbed. The suspension is then filtered at the pump and washed with distilled water until no more chloride is detectable in the filtrate. The residue on the filter is made into a slurry with 700 parts water and a solution of 50 parts zinc acetate in 200 parts water added to the slurry. The mixture is stirred for 20 minutes at room temperature and for 60 minutes at the boiling point. The mixture is filtered with suction and the precipitate dried, a yield of 170 parts catalyst being obtained.

5 parts of catalyst is suspended in a solution of 26 parts cyclooctatetraene (0.25 mole) in 225 parts ethyl acetate. The mixture is treated with hydrogen at room temperature with efficient agitation. The hydrogenation ceases when 17.95 parts by volume of hydrogen has been absorbed. The mixture is filtered and distilled. A yield of 24 parts pure cyclooctene, B.P. 143.5° to 144.5° C. (760 mm. Hg), is obtained. Similar results are obtained by using 150 parts bismuth (III) chloride in 500 parts 10% aqueous hydrochloric acid, 70 parts vanadium (III) chloride in 250 parts water or 140 parts zirconium oxychloride octahydrate in 400 parts water, in place of zinc acetate.

*Example 2*

3 parts of the catalyst as described in Example 1 is suspended in a solution of 27 parts 1,3-cyclooctadiene in 135 parts ethyl acetate. The mixture absorbs 6.16 parts by volume of hydrogen at room temperature. The catalyst is filtered off; 25 parts cyclooctene is obtained by distillation.

*Example 3*

27 parts 1,5-cyclooctadiene is hydrogenated in the manner described in Example 2. 5.95 parts by volume of hydrogen is absorbed and 24 parts pure cyclooctene is obtained by distillation.

*Example 4*

A catalyst containing 0.5% palladium on magnesium silicate as carrier is prepared as described in Example 1. 3 parts butylamine is added to a suspension of 80 parts of this catalyst in a solution of 330 parts cyclopentadiene in 1100 parts dibutyl ether. The mixture is hydrogenated under normal pressure and at room temperature in a vessel fitted with a stirrer. The catalyst is filtered off when the absorption of hydrogen has ceased. 330 parts cyclopentene is obtained by distillation and is shown by gas chromatographic analysis to be free from cyclopentadiene and to contain 0.7% cyclopentane.

*Example 5*

10 parts of the catalyst described in Example 1 is added to a solution of 132 parts dicyclopentadiene in 135 parts ethyl acetate. The mixture is shaken with hydrogen at 30° to 40° C. 24.5 parts by volume of hydrogen is consumed in 6 hours. The hydrogen absorption then ceases. After working up in the manner described, 120 parts of a tricyclodecene is obtained which is shown by infra-red analysis to have the following structure:

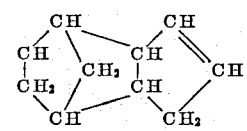

The product is homogeneous when examined by gas chromatography and boils at 64° to 64.5° C. (13 mm. Hg). The melting point is 37° to 38° C.

*Example 6*

A solution of 8.3 parts palladium (II) chloride in 100 parts water and 2 parts concentrated hydrochloric acid are added to a suspension of 100 parts aluminum oxide in 400 parts water. The suspension is heated to 90° C. and a solution of 300 parts sodium acetate and 10 parts sodium hydroxide in 750 parts water is added gradually to precipitate the palladium. The precipitated hydrated palladium oxide is reduced to the metal with hydrogen at room temperature. The catalyst is separated from the solution and washed thoroughly with water.

1 part of the catalyst is suspended in solutions consisting of 1.66 parts water and the quantities of metal salt given in the table below. The mixture is boiled for a short time, filtered and the catalyst dried at 40° C. under reduced pressure. The selectivity, expressed as the ratio of the hourly hydrogen absorption before and after attainment of the monoolefine stage, is determined by adding 1 part of the catalyst to a solution of 5.2 parts cyclooctatetraene in 18 parts ethyl acetate. The suspension is shaken with hydrogen at room temperature and under normal pressure and the amounts of hydrogen absorbed hourly before and after attainment of the cyclooctene stage. The results are given in the following table:

| Parts metal salt per 1 part catalyst | Total hydrogen absorption, parts by volume | Hourly hydrogen absorption before and after the partial stage | | Selectivity, parts by volume $H_2$/hr. before; parts by volume $H_2$/hr. after the partial stage |
|---|---|---|---|---|
| Unpoisoned catalyst | 4,800 | 1.500 | 0.350 | 4:1 |
| 0.020 copper (II) chloride | 3,720 | 0.800 | 0.020 | 40:1 |
| 0.11 silver nitrate | 3,700 | 1.100 | 0.020 | 55:1 |
| .097 zinc acetate | 3,650 | 1.500 | 0.010 | 150:1 |
| 0.090 cadmium acetate | 3,700 | 1.500 | 0.030 | 50:1 |
| 0.030 mercury (II) chloride | 3,760 | 0.800 | 0.040 | 20:1 |
| 0.018 thallium (I) nitrate | 3,700 | 1.500 | 0.025 | 60:1 |
| 0.037 lead (II) acetate | 3,700 | 1.300 | 0.005 | 250:1 |
| 0.00033 antimony (III) chloride [1] | 3,700 | 0.500 | 0.020 | 25:1 |
| 0.127 iron (II) chloride | 3,700 | 1.000 | 0.030 | 33:1 |
| 0.053 iron (III) chloride | 3,700 | 0.700 | 0.030 | 23:1 |

[1] Added to the suspension in the form of a solution of 0.00033 part antimony (III) chloride in 0.5 part methanol.

In the experiments with the poisoned catalysts a pure cyclooctene with an iodine value corresponding to the theoretical, is obtained after removal of the solvent.

*Example 7*

8.5 parts palladium (II) chloride is dissolved in 700 parts water and 10 parts concentrated hydrochloric acid. 100 parts sodium acetate and 100 parts active charcoal are added and the suspension is heated to 70° C. A solution of 10 parts sodium hydroxide in 150 parts water is added dropwise to the suspension and the precipitated hydrated palladium oxide is reduced by shaking with hydrogen at room temperature. The catalyst is filtered off from the solution, washed thoroughly with water and dried at 40° C. under reduced pressure.

1 part of the catalyst is heated for a short time to boiling with a solution of 0.22 part zinc acetate in 40 parts water. The catalyst is filtered off and dried at 40° C. under reduced pressure. 5.2 parts cyclooctatetraene in 18 parts ethyl acetate is hydrogenated with the catalyst. A selectivity of 200:1 is determined. Pure cyclooctene is obtained by distillation.

*Example 8*

5 parts of the palladium catalyst prepared according to Example 6, para. 1, is suspended in a solution of 0.33 part zinc acetate in 7 parts water. The suspension is heated for 5 minutes at 90° to 95° C. and the solid component separated from the solution and dried at 40° C. under reduced pressure. A solution of 20.8 parts cyclooctatetraene in 72 parts ethyl acetate and 0.02 part butylamine is hydrogenated with this catalyst at room temperature and under normal pressure. Approximately 7 parts by volume of hydrogen is absorbed per hour before the cyclooctene stage is reached. After attainment of the cyclooctene stage, the hydrogen absorption is only 0.05 part by volume per hour. The selectivity is thus 140:1. Altogether 14.5 parts by volume of hydrogen is absorbed, the theoretical requirement being 14.4 parts by volume. The product, after working up by the method described, has an iodine value of 231 which is equal to the theoretical value. The product has the following composition as determined by gas chromatographic analysis:

| | Percent by weight |
|---|---|
| Cyclooctane | 1.8 |
| Cyclooctene | 96.9 |
| 1,3-cyclooctadiene | 0.9 |
| 1,5-cyclooctadiene | 0.4 |
| Cyclooctatetraene | 0 |

*Example 9*

A catalyst is produced by adding a solution of 5.3 parts palladium chloride in 100 parts water and 2 parts concentrated hydrochloric acid to a solution of 110 parts zinc acetate in 500 parts water, heating the mixture to 60° to 70° C. and adding 10% soda solution with stirring until the suspension produced by precipitation has a pH of 7.5 to 8. The suspension is then heated for approximately 5 minutes at 80° C. After cooling, the hydrated palladium oxide precipitated together with the zinc salt is reduced to metal by shaking the suspension with hydrogen. The precipitate is filtered off and dried. The yield is 64 parts of catalyst.

0.5 part of catalyst is suspended in a solution of 5.4 parts 1-vinyl-1-cyclohexene in 15.6 parts cyclohexane. The mixture is treated with hydrogen at room temperature with efficient agitation. 1.34 parts by volume of hydrogen is absorbed in 40 minutes, 0.045 part by volume in the following 20 minutes and 0 part by volume in the following 360 minutes. The hydrogenation thus comes to a complete standstill shortly after the attainment of the ethylcyclohexene stage.

*Example 10*

10.8 parts 1,3-cyclooctadiene in 30 parts propyl acetate is hydrogenated using 0.5 part of the catalyst described in Example 4. The total hydrogen absorption at 25° C. is 2300 cc. The rate of hydrogenation before attainment of the cyclooctene stage is 1200 cc. per hour and is subsequently less than 20 cc. per hour. The selectivity is thus in excess of 60:1. The total absorption of hydrogen at 95° C. is 2300 cc. and the rate of hydrogenation before attainment of the cyclooctene stage is 1500 cc. per hour and subsequently is less than 50 cc. per hour. The selectivity is thus in excess of 50:1.

We claim:

1. A process for the selective hydrogenation of cycloaliphatic compounds containing at least two olefinic double bonds to produce compounds containing one olefinic double bond which comprises: contacting said cycloaliphatic compounds with molecular hydrogen in the presence of metallic palladium and a composition selected from the group consisting of salts, hydroxides and oxides of a second heavy metal, said second heavy metal being selected from the group consisting of copper, silver, zinc, cadmium, mercury, thallium, lead, tin, antimony, bismuth, vanadium, zirconium and iron.

2. An improved process as claimed in claim 1 wherein said second heavy metal is zinc.

3. An improved process as claimed in claim 1, wherein said second heavy metal is lead.

4. An improved process as claimed in claim 1, wherein the hydrogenation is carried out at a temperature between −20° and +150° C.

5. An improved process as claimed in claim 1, wherein the starting material is a cycloaliphatic hydrocarbon which contains a cycloaliphatic ring with 5 to 12 carbon atoms and 2 to 4 double bonds.

(References on following page)

References Cited by the Examiner
UNITED STATES PATENTS

| | | | |
|---|---|---|---|
| 2,793,238 | 5/1957 | Banes et al. | 260—666 |
| 2,887,517 | 5/1959 | Noeske et al. | 260—666 |
| 2,888,397 | 5/1959 | Burton et al. | 208—111 |
| 2,953,612 | 9/1960 | Haxton et al. | 260—683.9 |
| 3,002,829 | 10/1961 | Kolfenbach et al. | 260—683.9 |
| 3,076,858 | 2/1963 | Frevel et al. | 260—681.5 |

OTHER REFERENCES
Webster's New Collegiate Dictionary, 1961, p. 585.

DELBERT E. GANTZ, *Primary Examiner.*

ALPHONSO D. SULLIVAN, *Examiner.*

S. P. JONES, *Assistant Examiner.*